United States Patent Office 3,542,927
Patented Nov. 24, 1970

3,542,927
REDUCTION OF BLOOD SUGAR LEVELS WITH
AMINOMETHYLINDOLES
James M. McManus, Old Lyme, and Billie Kenneth Koe,
Gales Ferry, Conn., assignors to Pfizer Inc., New York,
N.Y., a corporation of Delaware
No Drawing. Original application Aug. 10, 1965, Ser. No.
478,759, now Patent No. 3,459,767, dated Aug. 5, 1969.
Divided and this application July 3, 1968, Ser. No.
749,901
Int. Cl. A61k 27/00
U.S. Cl. 424—274
6 Claims

ABSTRACT OF THE DISCLOSURE

Compounds of the formula

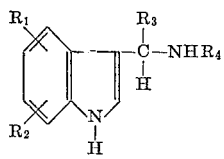

and

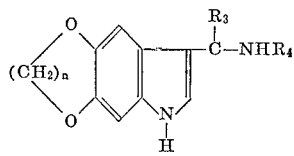

and their acid addition salts wherein $R_1$ and $R_2$ may be hydrogen, hydroxy, fluorine, chlorine, alkyl and alkoxy; $n$ is 1 or 2 and $R_3$ and $R_4$ are alkyl, cycloalkyl, alkoxyalkyl or alkylthioalkyl, each of the aforesaid alkyl moieties being of specified carbon atom content, and the utility thereof as oral hypoglycemic agents.

CROSS-REFERENCE TO RELATED APPLICATION

This application is a division of application Ser. No. 478,759, filed Aug. 10, 1965, now U.S. Pat. No. 3,459,767.

This invention relates to new and useful organic amine compounds, which are effective in reducing blood sugar levels. More particularly, it is concerned with various novel aminomethylindoles and their acid addition salts. The free bases of these aminomethylindoles and their pharmaceutically acceptable acid addition salts are useful as oral hypoglycemic agents for the treatment of diabetic subjects. The pharmaceutically unacceptable acid addition salts are useful as intermediates and in the recovery and purification of the pharmaceutically acceptable compounds of the present invention.

The novel compounds which are included within the purview of the present invention are all selected from the class of aminomethylindoles of the formulae:

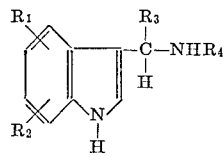

and

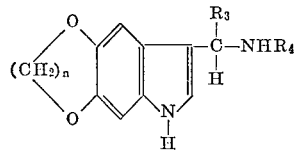

and their acid addition salts, wherein $R_1$ and $R_2$ are each a member selected from the group consisting of hydrogen, hydroxy, fluorine, chlorine, alkyl and alkoxy each containing up to four carbon atoms; $n$ is an integer of from one to two, inclusive; $R_3$ is a member selected from the group consisting of alkyl having from two to five carbon atoms, cycloalkyl containing up to six carbon atoms, and alkoxyalkyl and alkylthioalkyl each containing up to a total of five carbon atoms; and $R_4$ is a member selected from the group consisting of alkyl having from one to five carbon atoms, cycloalkyl containing up to ten carbon atoms, and alkoxyalkyl and alkylthioalkyl each containing up to a total of five carbon atoms. Typical member compounds of this series include 3-(1-isopropylamino-2-methylpropyl)-5-methoxyindole,
3-(1-isopropylamino-n-butyl)-5-methoxyindole,
3-(1-cyclopentylamino-2-methylpropyl)-5-methoxyindole,
3-(1-isopropylamino-n-butyl)indole,
3-(1-cycloheptylamino-2-methylpropyl)indole,
3-(1-isopropylamino-n-methylpropyl)-5,6-methylenedioxyindole,
3-(1-isopropylamino-3-methyl-n-butyl)-5,6-methylenedioxyindole,
3-(1-isopropylamino-2-methylpropyl)-5-hydroxyindole, and the like.

The process employed for preparing the novel compounds of this invention involves reacting the corresponding indole compound lacking the side chain at the 3-position of the molecule with an unsaturated compound of the formula $R_3CH\!=\!NHR_4$ wherein the symbols indicated have the same meaning as before. This reaction is carried out by mixing the two reactants together in at least substantially equimolar proportions, although a slight excess of the unsaturated reagent, i.e., the aldimine compounds, is not harmful and may even serve to accelerate completion of the reaction. The reaction is normally conducted in an acidic solvent medium and preferably in one of a lower alkanoic acid such as formic acid, acetic acid, propionic acid, butyric acid, and so forth. The presence of still another additional solvent in the reaction medium, such as a reaction-inert neutral organic solvent like an aromatic hydrocarbon solvent, may also be helpful in this connection, but this is not always absolutely necessary or even required in certain instances. Aromatic hydrocarbon solvents for these purposes would include benzene, toluene, xylene, and the like, but still other type solvents, such as tertiary alcohols like tertiary-butanol, 1,1-dimethylpropanol and 1,1-dimethylpentanol, may also be employed with equally satisfactory results being achieved. In general, reaction temperatures ranging from about 0° C. up to about 60° C. are ordinarily sufficient for the purposes at hand, with the time period ranging from between about two to about twenty hours.

Upon completion of the reaction, recovery of the desired product may be easily achieved by such standard means as first diluting the acidic reaction medium with water and then neutralizing. Preferably, the pH of the reaction medium is adjusted to a value of at least about pH 9.0, followed by extraction of the basic aqueous solution with a water-immiscible organic solvent to remove the free organic base compound itself, i.e., the free aminomethylindole compound. Further purification may then be achieved, if so desired, by a series of extractions involving converting the base compound back to a salt and then back to base compound once again. Isolation of the desired aminomethylindole is finally accomplished by evaporating the organic solvent to achieve a residual oil, which can then be triturated with a further solvent such as a lower alkane hydrocarbon solvent like pentane to yield the desired base in crystalline form.

The indole starting materials necessary for the aforementioned reaction process of this invention are, for the most part, known compounds which are either commercially available or else easily prepared in accordance with standard organic procedures previously described in the chemical literature. The aldimine reagents, on the other hand, are all readily prepared from commonly available organic starting materials using conventional techniques and procedures well-known to those skilled in the art. For instance, an aldehyde of the formula $R_3CHO$ can be condensed with an amine of the formula $R_4NH_2$ to yield the desired aldimine in accordance with the conventional method described by K. Campbell et al. in the Journal of the American Chemical Society, vol. 66, p. 82 (1944) for the preparation of the butylidene-isopropylamine aldimine.

Inasmuch as the aminomethylindole compounds of this invention are all basic in nature, they are capable of forming salts with both inorganic and organic acids. Conversion of pharmaceutically unacceptable acid addition salts to pharmaceutically acceptable acid addition salts is accomplished by recovering the free base as described above and treating it with at least a substantially equimolar amount of the chosen pharmaceutically acceptable acid in an aqueous solution or in an organic solvent such as methanol or ethanol. The solid salt is then obtained upon evaporation of the solvent, and this usually occurs in the form of a crystalline residue. Among the various acids which can be used to prepare the preferred pharmaceutically acceptable acid addition salts of this invention in the manner just described are those which contain pharmacologically acceptable anions such as, for example, hydrochloric acid, hydrobromic acid, nitric acid, sulfuric acid, phosphoric acid, acetic acid, lactic acid, citric acid, tartaric acid, oxalic acid, benzoic acid, succinic acid, maleic acid, methanesulfonic acid, ethanesulfonic acid, benzenesulfonic acid and p-toluenesulfonic acid, etc. The pharmaceutically unacceptable salts, while not useful per se therapeutically, are useful as intermediates in the preparation of the pharmaceutically acceptable salts, as described above, in addition to being useful in the isolation and/or purification of the parent base compounds themselves.

As previously indicated, the aminomethylindole compounds of this invention are all readily adapted to therapeutic use as oral hypoglycemic agents in view of their ability to lower the blood sugar of diabetic subjects. For instance, 3-(1-isopropylamino-2-methylpropyl)-5-methoxylindole as the hydrochloride has shown good hypoglycemic activity in the normal fasted rat, as well as in the mildly alloxanized rat and in the normal fasted dog, with pronounced hypoglycemia being observed in the latter animal at dose levels ranging from 5 mg./kg. to 20 mg./kg. Additionally, none of these compounds cause any unwanted side effects to occur in the subjects to whom they are so administered, i.e., no problems of toxicity or any untoward side effects of either a gross or microscopic pathological nature have ever been encountered with these compounds when they are orally administered in the manner indicated above.

In accordance with a method of treatment of the present invention, the herein described hypoglycemically effective aminomethylindoles can be administered to a diabetic subject via the oral route of administration. In general, these compounds are most desirably administered in doses ranging from about 25 mg. up to about 1.0 g. per day, although variations will still necessarily occur depending upon the weight of the subject being treated. However, a dosage level that is in the range of from about 0.4 mg. to about 15 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of oral pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In connection with the use of the aminomethylindole compounds of this invention for the treatment of diabetic subjects, it is to be noted that they may be administered either alone or in combination with pharmaceutically acceptable carriers and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage.

In the latter connection, the compounds of this invention may be administered in suitable unit dosage forms which will preferably contain at least about 5 mg. per dosage unit, although concentration levels in the range of from about 5 mg. to about 250 mg. per unit dosage per day may be employed to advantage. When larger doses of these hypoglycemic agents are to be employed, it is preferable to administer two or more unit doses at various time intervals, adjusting, if necessary, the content of the antidiabetic agent per unit dosage form accordingly. Moreover, multiple dose treatment has indicated the feasibility, in some instances, of administering the aminomethylindole-containing compositions at periodic time intervals, e.g., by orally administering the hypoglycemic agent to an afflicted subject at a dosage level that is in the range of approximately 0.200–1.0 g. per day divided into about two to about five doses of equal strength that are to be administered throughout the day. Furthermore, optimum results can often be achieved in such cases by administering a higher dose initially, followed by the administration of a maintenance dose of therapy at a lower dosage thereafter, e.g. 1.0 g. the first day, 0.6 g. the second day, 0.4 g. the third day and 0.2 g. per day thereafter.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include the high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various like combinations thereof.

This invention is further illustrated by the following examples, which are not to be construed in any way or manner as imposing limitations upon the scope thereof.

EXAMPLE I

To a chilled slurry of 50 g. (0.34 mole) of 5-methoxyindole in 60 ml. of glacial acetic acid, there were added 42.2 g. (0.374 mole) of isobutylidene-isopropylamine at 10° C. with the aid of constant stirring, followed by the addition of 10 ml. of benzene to the reaction mixture. Upon completion of this step, which required about twenty minutes, the reaction mixture was further stirred with cooling for an additional two hours and then allowed to stand at room temperature for approximately 16 hours. The resulting solution was then slowly poured into 600 ml. of ice-water that had been made strongly alkaline by the addition of 20% sodium hydroxide solution, and the gum which subsequently formed was extracted into two separate 350 ml. portions of diethyl ether. The combined ether layers were then washed with 100 ml. of water and treated with two 250 ml. portions of 1 M potassium bisulfate solution. The latter aqueous extracts were saved and washed with 100 ml. of ether, then made basic with 20% aqueous sodium hydroxide and extracted into two 300 ml. portions of diethyl ether that were subsequently dried over anhydrous sodium sulfate. After removal of the drying agent by means of filtration and the solvent by means of evaporation under reduced pressure, there was obtained a residual oil that after trituration with cold pentane gave 49.7 g. (55%) of crude 3 - (1 - isopropylamino-2-methylpropyl)-5-methoxyindole base melting at 96–98° C.

A 2 g. sample of this base was then converted to the corresponding hydrochloride salt by dissolving said base in diethyl ether and adding gaseous hydrogen chloride dissolved in ethyl acetate (a saturated solution was employed) to the ethereal solution. In this manner, there was obtained 2.2 g. of the crude salt, melting at 125–127° C. The hydrochloride was purified by dissolving same in a small volume of methanol and then adding sufficient diether ether to render the resulting solution turbid. On cooling, 850 mg. of 3-(1-isopropylamino-2-methylpropyl)-5-methoxyindole hydrochloride soon deposited, M.P. 129.5–130° C.

*Analysis.*—Calcd. for $C_{16}H_{24}N_2O \cdot HCl$ (percent): C, 64.74; H, 8.49; N, 9.44. Found (percent): C, 64.75; H, 8.19; N, 9.22.

EXAMPLE II

The procedure described in Example I was essentially repeated, only this time 9.2 g. (0.062 mole) of 5-methoxyindole were reacted with 9.1 g. (0.069 mole) of butylidene-isopropylamine aldimine in the presence of 30 ml. of glacial acetic acid containing 15 ml. of benzene. In this manner, there were obtained 9.8 g. of free base, viz, 3-(1-isopropylamino-n-butyl)-5-methoxyindole, melting at 94.5–97° C. After one recrystallization from boiling n-hexane, the analytical sample melted at 95–97° C.

*Analysis.*—Calcd. for $C_{16}H_{24}N_2O$ (percent): C, 73.80; H, 9.29; N, 10.76. Found (percent): C, 73.68; H, 9.22; N, 10.57.

EXAMPLE III

The procedure described in Example I was essentially followed except that 29.3 g. (0.025 mole) of indole and 31 g. (0.0275 mole) of butylidene-isopropylamine were reacted together in the presence of 150 ml. of glacial acetic acid also containing 50 ml. of benzene. In this manner, there were obtained 27 g. of free base, viz, 3-(1-isopropylamino-n-butyl)indole, M.P. 74.5–77° C., which was subsequently converted to the corresponding hydrochloride, also in the manner of Example I. 3-(isopropylamino-n-butyl)indole hydrochloride melted at 131–133° C. after one recrystallization from methanol-diethyl ether.

*Analysis.*—Calcd. for $C_{15}H_{22}N_2 \cdot HCl$ (percent): C, 67.52; H, 8.69; N, 10.50. Found (percent): C, 67.19; H, 9.03; N, 10.31.

EXAMPLE IV

The procedure described in Example I was essentially repeated, only this time 5.15 g. (0.035 mole) of 5-methoxyindole and 5.35 g. (0.0385 mole) of isobutylidine-cyclopentylamine were reacted together in the presence of 12 ml. of glacial acetic acid containing 8 ml. of benzene. In this manner, 3-(1-cyclopentylamino-2-methylpropyl)-5-methoxyindole was the product obtained, which after subsequent conversion to the hydrochloride (6.27 g.) and recrystallization from methanol-diethyl ether gave analytically pure 3-(1-cyclopentylamino-2-methylpropyl)-5-methoxyindole hydrochloride.

*Analysis.*—Calcd. for $C_{18}H_{25}N_2O \cdot HCl$ (percent): C, 66.95; H, 8.43; N, 8.68. Found (percent): C, 67.22; H, 8.38; N, 8.46.

EXAMPLE V

The procedure described in Example I was essentially followed once again, only this time 3.2 g. (0.02 mole) of 5,6-methylenedioxyindole and 2.8 g. (0.022) mole) of isovalerylidene-isopropylamine were reacted together in the presence of 12 ml. of glacial acetic acid containing 8 ml. of benzene. In this manner, the product obtained was 3-(1-isopropylamino-3-methyl-n-butyl)-5,6-methylenedioxyindole, which after subsequent conversion to the hydrochloride in the manner of Example I gave 1.6 g. of 3-(1-isopropylamino-3-methyl-n-butyl)-5,6-methylenedioxyindole hydrochloride, M.P. 145–146.5° C.

*Analysis.*—Calcd. for $C_{17}H_{22}N_2O \cdot HCl$ (percent): C, 62.85; H, 7.76; N, 8.62. Found (percent): C, 63.07; H, 7.63; N, 8.65.

EXAMPLE VI

The procedure described in Example I was essentially followed except that 11.7 g. (0.10 mole) of indole and 18.3 g. (0.11 mole) of isobutylidenecycloheptylamine aldimine were reacted together in the presence of 35 ml. of glacial acetic acid also containing 15 ml. of benzene. In this particular case, the free base was not isolated and there was finally obtained 10 g. of crude hydrochloride as the desired product. After recrystallization from methanol-diethyl ether, this material gave analytically pure 3-(1-cycloheptyl-amino-2-methylpropyl)indole hydrochloride, M.P. 130–131° C.

*Analysis.*—Calcd. for $C_{19}H_{28}N_2 \cdot HCl$ (percent): C, 71.11; H, 9.11; N, 8.73. Found (percent): C, 71.18; H, 8.82; N, 8.71.

Subsequent conversion of the above hydrochloride to the free base via treatment with 5 N NaOH then affords the pure 3-(1-cycloheptylamino-2-methylpropyl)indole.

EXAMPLE VII

The procedure described in Example I was essentially followed to prepare the compounds listed below, using the appropriate indole starting materials and aldimine reagents in each case. In those instances where the hydrochloride was not made, the aminomethylindole base, obtained in each case, is reported as the final product instead.

3-(1-cyclopropylamino-2-methylpropyl)indole hydrochloride, M.P. 126–127.5° C.

3-(1-cyclopropylamino-2-methylpropyl)-5-methoxyindole hydrochloride, M.P. 110–112° C.

3-(1-cyclopropylamino-2-methylpropyl)-5,6-methylenedioxyindole hydrochloride, M.P. 126–127° C.

3-(1-isopropylamino-3-methyl-n-butyl)-5-methoxyindole hydrochloride, M.P. 139–140.5° C.

3-(1-sec-butylamino-3-methyl-n-butyl)-5-methoxyindole hydrochloride, M.P. 128.5–130° C.

3-[1-(1-methyl-2-methoxyethylamino)-2-methylpropyl] indole hydrochloride, M.P. 133–134.5° C.

3-(1-isopropylamino-3-ethylthiopropyl)indole hydrochloride, M.P. 133–135° C.

3-(1-isopropylamino-n-butyl)-5-methoxyindole, M.P. 95–97° C.

3-(1-isopropylamino-3-methyl-n-butyl)indole hydrochloride, M.P. 128–130° C.
3-(1-isopropylamino-n-amyl)-5-methoxyindole hydrochloride, M.P. 131–132° C.
3-(1-sec-butylamino-2-methylpropyl)-5-methoxyindole hydrochloride, M.P. 115.5–117.5° C.
3-(1-isopropylamine-2-methylpropyl)-5,6-methylenedioxyindole hydrochloride, M.P. 132.5–134° C.
3-(1-isopropylamino-1-cyclohexylmethyl)indole hydrochloride, M.P. 129.5–131° C.
3-(1-isopropylamino-2-methylpropyl)-6-methoxyindole hydrochloride, M.P. 127–129° C.
3-(1-cyclooctylamino-2-methylpropyl)indole hydrochloride, M.P. 121–123° C.
3-(1-isopropylamine-n-propyl)indole hydrochloride, M.P. 137–138.5° C.
3-(1-isopropylamino-2-methylpropyl)-5-methylindole hydrochloride, M.P. 132–134° C.
3-(1-cyclopentylamino-2-methylpropyl)indole hydrochloride, M.P. 132–134° C.
3-(1-isopropylamino-n-propyl)-5-methoxyindole hydrochloride, M.P. 141–145° C.
3-(1-isopropylamino-1-cyclopropylmethyl)-5-methoxyindole hydrochloride, M.P. 139–140° C.
3-(1-isopropylamino-2-methylpropyl)-5-hydroxyindole hydrochloride, M.P. 132–133.5° C.
3-(1-isopropylamino-2-methylpropyl)-5,6-ethylenedioxyindole hydrochloride dimethylate, M.P. 108–109° C.
3-(1-isopropylamino-2-methylpropyl)-5,7-dimethoxyindole hydrochloride, M.P. 153–154° C.
3-(1-isopropylamino-2-methylpropyl)-6,7-dimethoxyindole hydrochloride, M.P. 137–140° C.
3-(1-isopropylamino-2-methylpropyl)-5,6-dimethoxyindole hydrochloride, M.P. 141–143.5° C.
3-(1-isopropylamino-2-methylpropyl)-5-chloroindole hydrochloride, M.P. 136.5–137.5° C.

EXAMPLE VIII

The procedure of Example I is again employed to prepare the following compounds, which are listed below in the table of this example, starting from the appropriate indole bases and corresponding aldimine reagents $$(R_3CH=NHR_4)$$

in each instance:

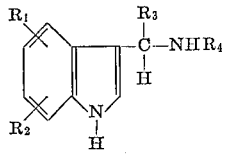

| $R_1$ | $R_2$ | $R_3$ | $R_4$ |
|---|---|---|---|
| H | H | $C_2H_5$ | Cyclo-$C_{10}H_{19}$ |
| H | H | $C_2H_4OC_2H_5$ | Iso-$C_3H_6SCH_3$ |
| H | H | Cyclo-$C_6H_{11}$ | n-$C_4H_9$ |
| H | 7-OH | $CH_2OC_2H_5$ | $CH_3$ |
| 5-OH | 6-OH | Iso-$C_3H_7$ | Cyclo-$C_4H_7$ |
| 5-OH | H | $CH_2SC_3H_7(n)$ | Iso-$C_3H_7$ |
| 4-$CH_3$ | H | Cyclo-$C_3H_5$ | Cyclo-$C_7H_{15}$ |
| H | 6-OH | Cyclo-$C_6H_{11}$ | $CH_2SC_3H_7(n)$ |
| 5-$C_2H_5$ | H | n-$C_5H_{11}$ | Cyclo-$C_5H_9$ |
| H | 7-n-$C_3H_7$ | $C_2H_5$ | Cyclo-$C_6H_{11}$ |
| 5-$CH_3$ | H | n-$C_3H_6OC_2H_5$ | Iso-$C_3H_6OCH_3$ |
| 5-$CH_3$ | 6-$CH_3$ | Cyclo-$C_5H_9$ | Cyclo-$C_3H_5$ |
| H | 6-$C_2H_5$ | $C_2H_4SCH_3$ | n-$C_4H_9$ |
| H | H | n-$C_3H_7$ | Cyclo-$C_9H_{17}$ |
| 5-F | H | n-$C_5H_{11}$ | Iso-$C_3H_6SC_2H_5$ |
| 4-$OCH_3$ | H | Cyclo-$C_4H_7$ | $CH_3$ |
| H | 7-$OCH_3$ | $C_2H_4OC_3H_7(i)$ | $C_2H_5$ |
| 5-$OC_3H_7(i)$ | H | $C_2H_5$ | Cyclo-$C_3H_5$ |
| H | 6-F | n-$C_5H_{11}$ | Iso-$C_3H_6OCH_3$ |
| H | 6-O$C_4H_9(n)$ | Cyclo-$C_6H_{11}$ | n-$C_5H_{11}$ |
| 5-$OCH_3$ | H | Iso-$C_3H_8SC_2H_5$ | Cyclo-$C_6H_{11}$ |
| H | 7-O$C_2H_5$ | Cyclo-$C_3H_5$ | Cyclo-$C_8H_{15}$ |
| 5-Cl | 6-Cl | $CH_2OC_2H_5$ | Iso-$C_3H_6SCH_3$ |
| 4-Cl | H | Iso-$C_3H_7$ | Iso-$C_3H_7$ |
| H | H | Cyclo-$C_6H_{11}$ | n-$C_5H_{11}$ |
| H | H | $C_2H_5$ | $C_2H_4SC_2H_5$ |
| H | H | $CH_2OCH_3$ | Tert-$C_4H_9$ |
| F | F | $CH_2SCH_3$ | Cyclo-$C_4H_7$ |
| 5-F | H | Iso-$C_3H_7$ | Iso-$C_3H_7$ |
| H | Cl | Cyclo-$C_3H_5$ | Cyclo-$C_{10}H_{19}$ |
| 5-Cl | H | $C_2H_4SC_2H_5$ | Iso-$C_3H_7OCH_3$ |
| H | H | Cyclo-$C_3H_9$ | $C_2H_5$ |
| H | 6-F | $CH_2SC_3H_7(i)$ | Cyclo-$C_8H_{15}$ |
| 4-OH | H | $C_2H_5$ | Cyclo-$C_6H_{11}$ |
| 5-F | H | $C_2H_4OC_2H_5$ | Cyclo-$C_{10}H_{19}$ |
| H | 7-OH | Acc-$C_4H_9$ | Cyclo-$C_4H_7$ |
| H | H | $C_2H_4SCH_3$ | $CH_2SC_2H_5$ |
| 5-n-$C_4H_9$ | H | Cyclo-$C_3H_9$ | Cyclo-$C_7H_{13}$ |
| 5-O$C_2H_5$ | 6-O$C_2H_5$ | Cyclo-$C_6H_{11}$ | Sec-$C_4H_9$ |
| H | 6-F | $C_2H_5$ | Cyclo-$C_3H_5$ |
| H | 7-O$C_2H_5$ | Cyclo-$C_6H_{11}$ | $CH_2OC_2H_5$ |
| 4-Cl | H | Cyclo-$C_3H_5$ | Cyclo-$C_{10}H_{19}$ |
| H | H | Cyclo-$C_4H_7$ | $CH_3$ |
| H | H | $C_2H_4OC_2H_5$ | Cso-$C_3H_7$ |
| 5-$OCH_3$ | 6-$OCH_3$ | Iso-$C_3H_7$ | $C_2H_4SCH_3$ |
| H | 7-Cl | $C_2H_5$ | $C_2H_4OC_3H_7(i)$ |
| H | H | $C_2H_4OC_2H_5$ | Iso-$C_3H_7$ |
| H | H | n-$C_5H_{11}$ | $CH_2SCH_3$ |

EXAMPLE IX

The procedure of Example I is again employed to prepare the following compounds, which are listed in the table below, starting from the appropriate indole bases and the corresponding aldimine reagents:

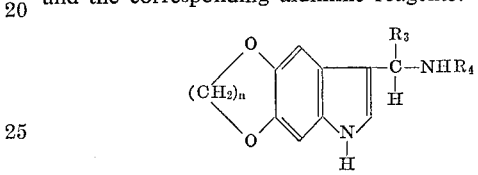

| n | $R_3$ | $R_4$ |
|---|---|---|
| 1 | $CH_2OC_2H_5$ | $C_2H_4SCH_3$ |
| 2 | $C_2H_4SC_2H_5$ | Iso-$C_3H_7$ |
| 1 | $C_2H_5$ | Cyclo-$C_{10}H_{19}$ |
| 1 | $CH_2SC_3H_7(i)$ | Cyclo-$C_{10}H_{19}$ |
| 2 | Cyclo-$C_3H_5$ | $C_2H_5$ |
| 1 | $C_2H_4OC_2H_5$ | Iso-$C_3H_7$ |
| 2 | Iso-$C_5H_{11}$ | $C_2H_4SC_2H_5$ |
| 1 | Cyclo-$C_6H_{11}$ | Iso-$C_3H_7$ |
| 2 | $C_2H_4SCH_3$ | $C_2H_4OC_2H_5$ |
| 2 | $C_2H_5$ | Cyclo-$C_{10}H_{19}$ |
| 2 | $C_2H_4SC_2H_5$ | Iso-$C_3H_7$ |
| 1 | Cyclo-$C_3H_5$ | Cyclo-$C_5H_9$ |
| 2 | Cyclo-$C_6H_{11}$ | Iso-$C_3H_6SCH$ |
| 1 | n-$C_5H_{11}$ | $C_2H_4OCH_3$ |
| 2 | Cyclo-$C_6H_{11}$ | $CH_3$ |
| 1 | Iso-$C_3H_7$ | Iso-$C_3H_6OCH_3$ |
| 1 | n-$C_4H_9$ | Cyclo-$C_7H_{13}$ |
| 2 | Cyclo-$C_6H_{11}$ | $CH_2OC_2H_5$ |
| 2 | Iso-$C_3H_7$ | Cyclo-$C_6H_{11}$ |
| 1 | $C_2H_5$ | n-$C_3H_7SC_2H_5$ |
| 2 | Iso-$C_3H_7$ | Iso-$C_3H_6OCH_3$ |
| 1 | Cyclo-$C_5H_9$ | Iso-$C_4H_9$ |
| 1 | $CH_2SC_2H_5$ | $CH_2SCH_3$ |
| 2 | $C_2H_5$ | Cyclo-$C_3H_5$ |
| 1 | $C_2H_4OC_2H_5$ | $C_2H_4OCH_3$ |
| 2 | $C_2H_5$ | $CH_2SC_3H_7(n)$ |
| 1 | Iso-$C_3H_6OCH_3$ | Cyclo-$C_{10}H_{19}$ |
| 2 | $C_3H_6OC_2H_5$ | n-$C_5H_{11}$ |
| 1 | $CH_2SC_4H_9(n)$ | Cyclo-$C_6H_{11}$ |
| 2 | $CH_2SCH_3$ | $CH_2OCH_3$ |
| 1 | $CH_2OCH_3$ | Iso-$C_3H_7$ |

EXAMPLE X

The other non-toxic hydrohalide salts of the aminomethylindole base compounds reported previously, such as the hydrochloride, hydrobromide and hydriodide salts, are prepared by first dissolving the respective organic base in absolute ether and then adding a saturated solution of the appropriate hydrohalide gas in ethyl acetate to the ethereal solution in the manner of Example I, whereupon the desired salt precipitates from solution. In this way, 3-(1-isopropylamino-n-butyl)-5-methoxyindole is converted to the corresponding hydrobromide salt in almost quantitative yield.

EXAMPLE XI

The nitrate, sulfate or bisulfate, phosphate or acid phosphate, citrate or acid citrate, tartrate or bitartrate, succinate, maleate, methanesulfonate, ethanesulfonate, benzenesulfonate and p-toluenesulfonate salts of each of the aforementioned aminomethylindole base compounds previously reported are prepared by dissolving the proper molar amounts of the respective acid and base in separate portions of ethanol and then mixing the two solutions together, followed by the addition of diethyl ether to the same in order to effect precipitation of the desired acid addition salt therefrom. In this manner, equimolar amounts of 3-(1-isopropylamino-2-methylpropyl)5-methoxyindole and concentrated sulfuric acid react to afford the corresponding sulfuric acid addition salt. In like manner, each of the other salts are also similarly prepared.

EXAMPLE XII

A dry solid pharmaceutical composition is prepared by blending the following materials together in the proportions by weight specified below:

| | |
|---|---:|
| 3-(1-isopropylamino-2-methylpropyl)-5-methoxyindole hydrochloride | 50 |
| Sodium citrate | 25 |
| Alginic acid | 10 |
| Polyvinylpyrrolidone | 10 |
| Magnesium stearate | 5 |

After the dried composition is thoroughly blended, tablets are punched from the resulting mixture, each tablet being of such size that it contains 100 mg. of the active ingredient. Other tablets are prepared in a similar manner containing 5, 10, 25 and 50 mg. of the active ingredient by merely using the appropriate amount of the aminomethylindole salt in each case.

EXAMPLE XIII

A dry solid pharmaceutical composition is prepared by combining the following materials in the proportions by weight indicated below:

| | |
|---|---:|
| 3-(1-isopropylamino-2-methylpropyl)-5,6-methylenedioxyindole hydrochloride | 50 |
| Calcium carbonate | 20 |
| Polyethylene glycol, average molecular weight 4000 | 30 |

The dried solid mixture so prepared is then thoroughly agitated so as to obtain a powdered product that is completely uniform in every respect. Soft elastic and hard-filled gelatin capsules containing this pharmaceutical composition are then prepared, employing a sufficient amount of material in each case so as to provide each capsule with 250 mg. of the active ingredient.

What is claimed is:

1. A process for lowering of blood sugar in the treatment of a diabetic animal subject which comprises orally administering to said subject an effective blood sugar lowering amount of a compound selected from the group consisting of aminomethylindoles of the formulae:

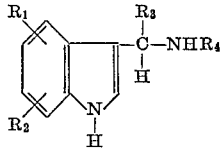

and

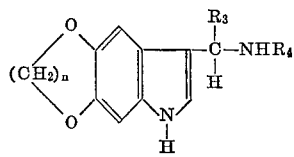

and their pharmaceutically acceptable acid addition salts wherein $R_1$ and $R_2$ are hydrogen, hydroxy, fluoro, chloro or alkyl or alkoxy containing from 1 to 4 carbon atoms; $n$ is an integer of from 1 to 2; $R_3$ is alkyl having from 2 to 5 carbon atoms, cycloalkyl containing from 3 to 6 carbon atoms or alkoxyalkyl or alkylthioalkyl containing a total of from 2 to 5 carbon atoms and $R_4$ is alkyl containing from 1 to 5 carbon atoms, cycloalkyl containing from 3 to 10 carbon atoms or alkoxyalkyl or alkylthioalkyl containing a total of from 2 to 5 carbon atoms.

2. The process of claim 1 wherein said compound is 3-(1-isopropylamino-2-methylpropyl)-5,7-dimethoxyindole.

3. The process of claim 1 wherein said compound is 3-(1-isopropylamino-2-methylpropyl)-5,7-dimethoxyindole hydrochloride.

4. A tablet for oral administration in the lowering of blood sugar in the treatment of diabetes containing a pharmaceutical carrier and about 5 mg. to about 250 mg. of a compound selected from the group consisting of aminomethylindoles of the formulae:

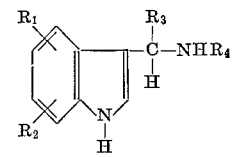

and

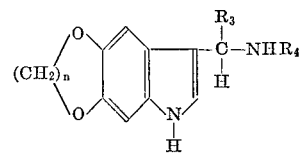

and their pharmaceutically acceptable acid addition salts wherein $R_1$ and $R_2$ are chloro or fluoro; $n$ is an integer of from 1 to 2; $R_3$ is alkyl having from 2 to 5 carbon atoms, cycloalkyl containing from 3 to 6 carbon atoms or alkoxyalkyl or alkylthioalkyl containing a total of from 2 to 5 carbon atoms and $R_4$ is alkyl containing from 1 to 5 carbon atoms, cycloalkyl containing from 3 to 10 carbon atoms or alkoxyalkyl or alkylthioalkyl containing a total of from 2 to 5 carbon atoms.

5. The tablet of claim 4 wherein said compound is 3-(1-isopropylamino-2-methylpropyl)-5,7-dimethoxyindole.

6. The tablet of claim 4 wherein said compound is 3-(1-isopropylamino-2 methylpropyl)-5,7-dimethoxyindole hydrochloride.

References Cited

UNITED STATES PATENTS

| | | | |
|---|---|---|---|
| 3,072,530 | 1/1963 | Hofmann et al. | 424—274 |
| 3,260,729 | 7/1966 | Allais | 424—274 |
| 3,296,072 | 1/1967 | Szmuszkovicz | 424—274 |
| 3,365,464 | 1/1968 | Szmuszkovicz | 424—274 |

JEROME D. GOLDBERG, Primary Examiner